United States Patent Office 3,346,251
Patented Oct. 10, 1967

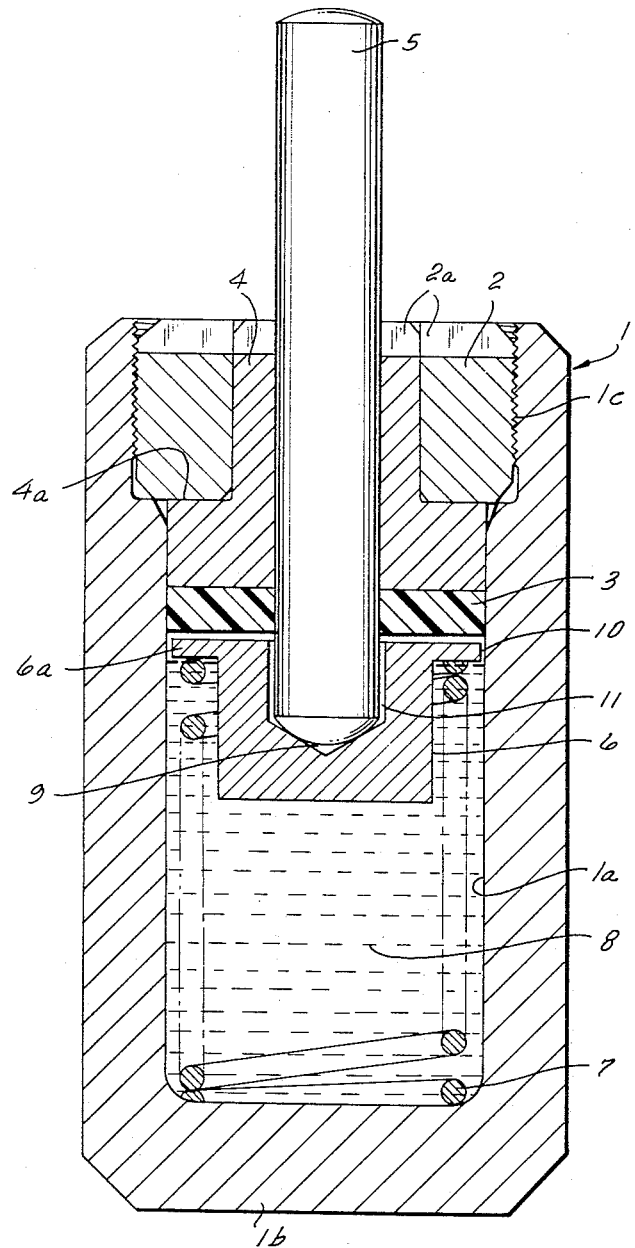

3,346,251
LIQUID SPRING
Karl Bittel, Markkleeberg, near Leipzig, Germany, assignor to Veb Zentrale Entwicklung und Konstruktion Zek Hydraulik, Leipzig, Germany
Filed May 28, 1965, Ser. No. 459,668
10 Claims. (Cl. 267—1)

ABSTRACT OF THE DISCLOSURE

A liquid spring which comprises a cylinder having an open end and a closed end and defining a chamber which contains a body of compressible liquid. The open end of the cylinder is closed by an annular sealing assembly received in such open end. A compound piston is received in the chamber and includes a head reciprocable therewithin and a rod extending through the open end of the cylinder and through the aperture of the annular sealing assembly, the rod having a forward portion abutting against the head. Resilient means is provided in the chamber and so arranged as to bias the head against the sealing assembly in the unstressed condition of the spring.

---

The present invention relates to liquid springs of the type wherein a body of compressible liquid is accommodated in a cylinder and undergoes compression which results in actual reduction in volume when the cylinder is moved with reference to a piston and/or vice versa.

It is already known to provide a liquid spring with a cylinder which accommodates a body of oil or another compressible liquid and cooperates with a piston to compress the liquid in response to axial stresses. The cylinder may be mounted on a fixed part and the piston can be connected with a movable part of a machine tool or the like so that the liquid spring acts as a shock absorber and yields only when the applied stress exceeds the resistance which the entrapped liquid offers to compressive forces.

A serious drawback of such conventional liquid springs is that their parts must be machined with utmost precision in order to prevent leakage of entrapped liquid, that the cylinder and/or the piston must be provided with costly sealing means, and that the piston must be formed with grooves, channels and similar precision-finished recesses to accommodate sealing rings and/or other sealing elements. Also, the piston must be provided with one or more annular flanges or bosses which engage suitable stops on the cylinder to prevent ejection or unintentional withdrawal of the piston when the liquid spring is not in actual use.

Accordingly, it is an important object of my invention to provide a very simple, rugged and inexpensive liquid spring wherein the piston need not carry sealing rings or similar sealing elements, wherein a portion of the piston may be inserted into or withdrawn from the cylinder by exertion of a small force and without necessitating even partial dismantling of the remaining component parts, and wherein the initial compression of entrapped liquid may be regulated in a very simple and time-saving manner.

Another object of the invention is to provide a liquid spring of the just outlined characteristics which is especially suited for use in machines wherein the piston and/or the cylinder must perform comparatively short strokes and wherein the entrapped liquid need not be subjected to exceptionally high compressive stresses.

A further object of the invention is to provide a very simple but highly effective sealing assembly which may be utilized in a liquid seal of the above outlined type.

A concomitant object of the invention is to provide a novel one-way valve which may be used in the improved liquid spring to prevent leakage of liquid along the piston.

Another object of my invention is to provide a liquid spring whose overall length may be changed at the will of the user and while the major part of the spring remains in fully assembled condition.

A further object of the invention is to provide a liquid spring which can be mounted and put to use in any desired position of inclination.

Briefly stated, one feature of my invention resides in the provision of a liquid spring which comprises a housing or cylinder having an open end, a closed end and defining an internal chamber which accommodates a body of oil or another compressible liquid, an annular sealing assembly mounted in the open end of the cylinder, a compound piston including a head which is reciprocably received in the chamber adjacent to the sealing assembly and an elongated rod which extends through the sealing assembly and abuts against the head, and resilient means for biasing the head against the sealing assembly.

In accordance with a more specific feature of my invention, that end face of the head which is turned away from the closed end of the cylinder is provided with a centrally located depression which receives the inner end portion of the rod with at least some clearance. Another clearance is provided between the internal surface of the cylinder and the peripheral surface of the head so that, when the rod is inserted through the sealing assembly, its inner end portion expels liquid from the depression, through the two clearances, and back into the cylinder chamber. The resilient means preferably comprises one or more prestressed helical springs operating between a bottom wall at the closed end of the cylinder and one or more flanges or shoulders provided on the head.

The novel features which are considered as characteristic of the invention are set forth in particular in the appended claims. The improved liquid spring itself, however, both as to its construction and the mode of assembling the same, together with additional features and advantages thereof, will be best understood upon perusal of the following detailed description of a specific embodiment with reference to the accompanying drawing which shows the liquid spring in axial section.

Referring to the drawing, the improved liquid spring comprises a cylinder or housing 1 having a bottom wall 1b at one end and an internally threaded portion 1c at the other end. This other (upper) end of the cylinder 1 is open, and the internally threaded portion 1c meshes with an annular retaining screw 2 forming part of a sealing assembly which prevents escape of a compressible liquid 8 (preferably oil). This liquid fills the internal chamber 1a of the cylinder 1 and its initial compression may be varied in response to rotation of the screw 2 which is provided with suitable projections 2a so that it can be engaged and rotated by a conventional tool, not shown. The sealing assembly further includes a guide sleeve 4 having an annular shoulder 4a which abuts against the inner end face of the screw 2 and is slidably but tightly fitted into the cylinder 1. The inner end face of the guide sleeve 4 abuts against an annular gasket 3 whose inner end face is in direct contact with the body of liquid 8. The sleeve 4 may consist of metallic or plastic material, for example, polyamide.

In accordance with an important feature of my invention, the liquid spring comprises a two-piece piston including a head 6 which is adjacent to the inner end face of the gasket 3 and a smooth-surfaced solid cylindrical rod 5. The inner end portion of the rod 5 extends with clearance into a concentric depression or blind bore 9 provided in the outer end face of the head 6, and this head comprises an annular flange 6a which extends toward but short of the internal surface of the cylinder 1.

The numeral 10 denotes a rather narrow annular gap between the periphery of the flange 6a and the cylinder 1, and the numeral 11 denotes an annular gap between the periphery of the rod 5 and the surface surrounding the blind bore 9.

The flange 6a consistutes a stop for the uppermost convolution of a resilient element here shown as a strong helical expansion spring 7 which tends to bias the head 6 against the gasket 3. The lowermost convolution of the spring 7 bears against the bottom wall 1b of the cylinder 1.

An intermediate portion of the rod 5 extends through registering central apertures provided in the gasket 3 and guide sleeve 4. The friction between the periphery of the rod 5 and the parts 3, 4 of the sealing assembly 2–4 suffices to prevent ejection of the rod in response to pressure of the liquid 8 when the liquid spring is not in actual use.

In assembling the liquid spring of my invention, the operator will proceed as follows:

The spring 7 is placed onto the bottom wall 1b and the chamber 1a is then filled with an accurately metered quantity of compressible liquid which forms the body 8. In the next step, the head 6 is inserted through the open end of the cylinder 1 so that its flange 6a comes to rest on the uppermost convolution of the spring 7. The operator then inserts the gasket 3 and the guide sleeve 4 prior to applying the screw 2. During assembling, some liquid might leak through the gap 10 and between the parts 3, 6a to enter the blind bore 9. In the final step, the rod 5 is introduced through the guide sleeve 4 and gasket 3 so that it inner end portion penetrates into the blind bore 9. This inner end portion expels some liquid through the annular gap 11, between the parts 3, 6a and through the annular gap 10 back into the chamber 1a. Thus, the rod 5 will also contribute to generation of an initial pressure in the chamber 1a, and such initial pressure can be regulated with requisite precision in response to rotation of the screw 2 with reference to the cylinder 1 or vice versa.

When the liquid spring is not in use, i.e., when the rod 5 is not subjected to axial stresses which tend to move it toward the bottom wall 1b or when the cylinder 1 is not subjected to axial stresses which tend to move it upwardly, as viewed in the drawing, the spring 7 biases the flange 6a against the inner end face of the gasket 3 to prevent escape of precompressed liquid into the blind bore 9. Of course, the precompressed liquid 8 tends to expand and assists the spring 7 to maintain the flange 6a in sealing engagement with the gasket 3. In other words, when the liquid spring is not in actual use, the head 6 and the spring 7 act not unlike a nonreturn or one-way valve which prevents leakage of liquid into the blind bore 9. As stated before, the friction between the smooth periphery of the rod 5 and the parts 3, 4 suffices to maintain the rod in the illustrated position when the liquid spring is not in actual use. The liquid spring may be mounted in a position as shown in the drawing, upside down, or in a position in which the common axis of the two-piece piston 5, 6 and the cylinder 1 is inclined with reference to a vertical plane.

Since the peripheral surface of the rod 5 is preferably smooth from end to end, the upper part of this rod may be mounted in relatively inexpensive needle bearings or the like, not shown. The entire liquid spring can be produced at a low cost and its components may be assembled or dismantled with little loss in time.

It is clear that the gasket 3 may be replaced by a multi-section sealing element or by a two-piece gasket, depending on the maximum compression of the liquid body 8.

The liquid spring of my invention is particularly suited for use in machines wherein the piston 5, 6 and/or the cylinder 1 must perform comparatively short strokes and wherein the liquid body 8 is subjected to relatively low compressive stresses.

Since the rod 5 may be inserted or removed without necessitating even partial dismantling of the remainder of the improved liquid spring, the overall length of the liquid spring may be increased or reduced in a very simple and time-saving manner, i.e., by replacing the rod 5 with a longer or shorter rod.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A liquid spring, comprising a cylinder having an open end and a closed end, said cylinder defining a chamber bounded by an inner circumferential surface and containing a body of compressible liquid; an annular sealing assembly received in the open end of said cylinder and having a front face facing said chamber; a compound piston, including a head reciprocably received in said chamber with clearance from said surface and having a rear face juxtaposed with said front face, and a removable rod extending through the aperture of said annular sealing assembly and having a portion abutting said head; and resilient means provided in said chamber and arranged to normally sealingly bias said rear face of said head against said front face of said sealing assembly whereby, when said rod is received from said aperture, escape of fluid from said chamber is prevented by the sealing engagement of said faces.

2. A liquid spring, comprising a cylinder having an open end and a closed end, said cylinder defining a chamber bounded by an inner circumferential surface and containing a body of compressible liquid; an annular sealing assembly received in the open end of said cylinder and having a front face facing said chamber; a compound piston, including a head reciprocably received in said chamber with clearance from said surface and having a rear face juxtaposed with said front face and provided with a centrally located depression, and a removable rod extending through the aperture of said annular sealing assembly and having an end portion extending with clearance into said depression; and resilient means provided in said chamber and arranged to bias said head against said rear face of said head sealingly against said front face of said sealing assembly in unstressed condition of said spring whereby, when said rod is received from said aperture, escape of fluid from said chamber is prevented by the sealing engagement of said faces.

3. A liquid spring as defined in claim 2, wherein said cylinder is provided with a threaded portion at said open end thereof, said sealing assembly comprises an annular member having threads meshing with said threaded portion, an annular gasket adjacent to said head and provided with said front face, and a guide sleeve located between said gasket and said annular member.

4. A liquid spring as defined in claim 2, wherein said cylinder comprises an internally threaded portion at said open end thereof, said sealing assembly comprising an annular screw meshing with said internally threaded portion, an annular gasket sealingly fitted into said cylinder and provided with said front face abutting against said head, and a guide sleeve received between said screw and said gasket, said screw being rotatable with reference to said cylinder to thereby change the initial compression of said liquid body.

5. A liquid spring as defined in claim 2, wherein said resilient means comprises a prestressed helical spring operating between said closed end and said head.

6. A liquid spring as defined in claim 2, wherein said depression is a blind bore; and wherein said sealing assembly comprises an annular gasket through which said rod extends, said gasket frictionally engaging the periphery of said rod.

7. A liquid spring as defined in claim 6, wherein said rod is an elongated smooth-surfaced solid cylindrical rod.

8. A liquid spring as set forth in claim 7, said cylinder having a bottom wall closing said closed end, and wherein said head comprises an annular flange and said resilient means comprises a prestressed helical spring having end convolutions abutting against said bottom wall and said flange.

9. A liquid spring as set forth in claim 7, further comprising an annular guide member slidably fitted into said cylinder between said gasket and said threaded member and having a central aperture snugly receiving a portion of said rod.

10. A liquid spring as defined in claim 2, wherein said front face of said resilient means and said rear face of said head together constitute a nonreturn valve which prevents leakage of liquid into said depression.

References Cited
UNITED STATES PATENTS

| | | | |
|---|---|---|---|
| 1,821,787 | 9/1931 | Black | 267—1 |
| 2,694,902 | 11/1954 | Baldwin | 60—54.6 |
| 2,852,921 | 9/1958 | Ayers | 60—54.6 |

FOREIGN PATENTS

| | | |
|---|---|---|
| 1,255,245 | 1/1961 | France. |

ARTHUR L. LA POINT, *Primary Examiner.*

R. M. WOHLFARTH, *Assistant Examiner.*